(12) United States Patent
Takahashi et al.

(10) Patent No.: US 10,129,435 B2
(45) Date of Patent: Nov. 13, 2018

(54) INTEGRATED CIRCUIT, IMAGE PROCESSING APPARATUS, AND IMAGE PROCESSING METHOD

(71) Applicant: FUJI XEROX CO., LTD., Tokyo (JP)

(72) Inventors: Kenichi Takahashi, Kanagawa (JP); Shunji Tsunashima, Kanagawa (JP); Kazuo Hayashi, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 15/243,515

(22) Filed: Aug. 22, 2016

(65) Prior Publication Data

US 2017/0257522 A1  Sep. 7, 2017

(30) Foreign Application Priority Data

Mar. 3, 2016 (JP) .................. 2016-041235

(51) Int. Cl.
*H04N 1/387* (2006.01)
*H04N 1/40* (2006.01)
*H04N 1/23* (2006.01)
*G06F 3/12* (2006.01)
*G06K 15/00* (2006.01)

(52) U.S. Cl.
CPC ....... *H04N 1/40068* (2013.01); *H04N 1/2338* (2013.01); *H04N 2201/0091* (2013.01)

(58) Field of Classification Search
CPC ............. H04N 1/40068; H04N 1/2338; H04N 1/3876; H04N 1/40; G06K 15/1889; G06K 15/1892; G06K 15/1852; G06K 15/1853; G06K 15/1855; G06K 9/342; G06K 9/34; G06K 9/00026

USPC ...... 358/3.06, 3.28, 1.9, 2.1, 1.11–1.18, 540, 358/537, 538, 443–445, 447, 448, 450, 358/452

See application file for complete search history.

(56) References Cited

U.S. PATENT DOCUMENTS

| | | | | |
|---|---|---|---|---|
| 4,513,278 A | * | 4/1985 | Seitz | G09G 5/42 315/367 |
| 5,862,257 A | * | 1/1999 | Sekine | G06T 1/00 358/3.01 |
| 6,219,454 B1 | * | 4/2001 | Kawano | G06T 9/001 382/166 |
| 7,222,235 B1 | * | 5/2007 | Mitsui | G06F 17/211 380/28 |

(Continued)

FOREIGN PATENT DOCUMENTS

JP 2003-099237 A 4/2003

*Primary Examiner* — Chad Dickerson
(74) *Attorney, Agent, or Firm* — Oliff PLC

(57) ABSTRACT

An integrated circuit includes a first signal line, a first circuit, a second signal line, and an attaching circuit. A first signal is transferred via the first signal line. The first circuit is connected to the first signal line and performs image processing upon the first signal being transferred thereto. The second signal line is connected to the first signal line, and a second signal indicating that the first signal has been transferred is transferred via the second signal line. The attaching circuit is connected to the second signal line and attaches, upon the second signal being transferred thereto via the second signal line, information corresponding to the second signal to an image resulting from the image processing performed by the first circuit.

8 Claims, 7 Drawing Sheets

(56) References Cited

U.S. PATENT DOCUMENTS

| | | | | |
|---|---|---|---|---|
| 7,248,287 | B1* | 7/2007 | Sogawa | G01B 11/272 348/188 |
| 2004/0151358 | A1* | 8/2004 | Yanagita | G06T 7/0012 382/132 |
| 2004/0184612 | A1* | 9/2004 | Kohiyama | G06T 1/0071 380/217 |
| 2005/0093886 | A1* | 5/2005 | Kubota | H04N 1/3872 345/619 |
| 2006/0104682 | A1* | 5/2006 | Shimazawa | G03G 21/04 399/366 |
| 2007/0018995 | A1* | 1/2007 | Koyanagi | H04N 1/46 345/589 |
| 2007/0236739 | A1* | 10/2007 | Murakami | G06K 15/02 358/3.06 |
| 2010/0272362 | A1* | 10/2010 | Ohnishi | H04N 1/00374 382/187 |

* cited by examiner

FIG. 6

| RESOLUTION OF IMAGE | ATTACHING METHOD |
|---|---|
| RESOLUTION < Th1 | PARTIAL MODIFICATION OF IMAGE |
| Th1 ≤ RESOLUTION < Th2 | YELLOW DOTS |
| Th2 ≤ RESOLUTION | DIGITAL WATERMARK |

FIG. 7

| NOTIFICATION SIGNAL TRANSFERRING FREQUENCY | FREQUENCY OF ATTACHING NOTIFICATION INFORMATION |
|---|---|
| FREQUENCY < 10 TIMES/DAY | EVERY IMAGE |
| 10 TIMES/DAY ≤ FREQUENCY < 50 TIMES/DAY | EVERY 5 IMAGES |
| 50 TIMES/DAY ≤ FREQUENCY | EVERY 10 IMAGES |

INTEGRATED CIRCUIT, IMAGE PROCESSING APPARATUS, AND IMAGE PROCESSING METHOD

CROSS-REFERENCE TO RELATED APPLICATIONS

This application is based on and claims priority under 35 USC 119 from Japanese Patent Application No. 2016-041235 filed Mar. 3, 2016.

BACKGROUND (i) Technical Field

The present invention relates to an integrated circuit, an image processing apparatus, and an image processing method.

(ii) Related Art

There are integrated circuits that include plural image processing circuits, such as a circuit for rescaling an image and a circuit for converting the color of an image. If such integrated circuits include a circuit which only specific users are authorized to use, it is desirable that whether the circuit has been used is checked to find out the use of the circuit by unauthorized users.

SUMMARY

According to an aspect of the invention, there is provided an integrated circuit including a first signal line, a first circuit, a second signal line, and an attaching circuit. A first signal is transferred via the first signal line. The first circuit is connected to the first signal line and performs image processing upon the first signal being transferred thereto. The second signal line is connected to the first signal line, and a second signal indicating that the first signal has been transferred is transferred via the second signal line. The attaching circuit is connected to the second signal line and attaches, upon the second signal being transferred thereto via the second signal line, information corresponding to the second signal to an image resulting from the image processing performed by the first circuit.

BRIEF DESCRIPTION OF THE DRAWINGS

An exemplary embodiment of the present invention will be described in detail based on the following figures, wherein:

FIG. 6 illustrates an example of an attaching method table;

FIG. 7 illustrates an example of an attaching frequency table; and

DETAILED DESCRIPTION

1. Exemplary Embodiment

Figure 1:
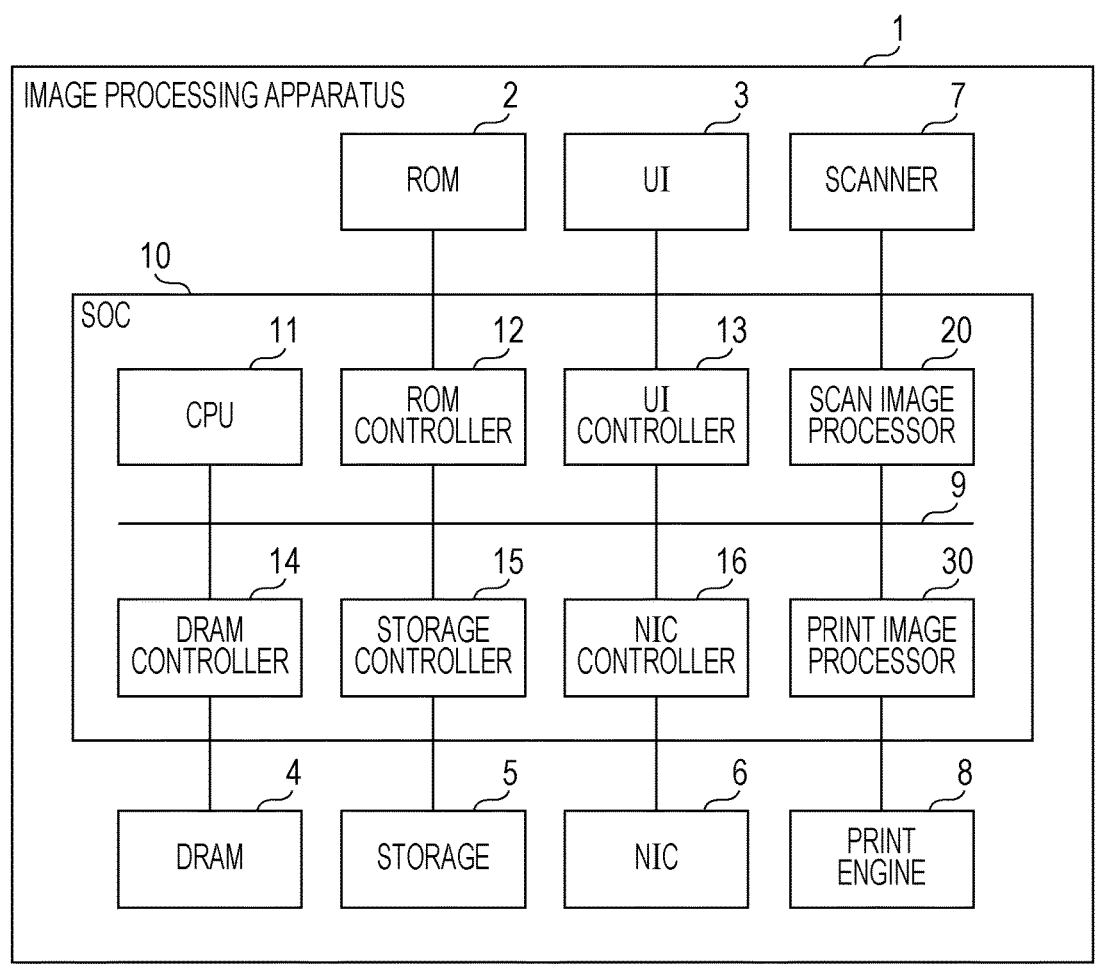
FIG. 1 illustrates a hardware configuration of an image processing apparatus according to an exemplary embodiment.

FIG. 1 illustrates a hardware configuration of an image processing apparatus 1 according to an exemplary embodiment. The image processing apparatus 1 provides image processing functions, such as a scan function, a print function, a copy function, and a fax function. The image processing apparatus 1 includes a system-on-a-chip (SOC) 10, a read only memory (ROM) 2, a user interface (UI) 3, a dynamic random access memory (DRAM) 4, a storage 5, a network interface card (NIC) 6, a scanner 7, a print engine 8, and a bus 9.

The SOC 10 is a semiconductor integrated circuit in which functions relating to image processing are integrally implemented. The ROM 2 is a memory that stores a program and data, for example. The UI 3 is an interface via which information is exchanged with a user. The UI 3 includes a touchscreen, buttons, and the like. The UI 3 displays information indicating the status of the image processing apparatus 1 and the status of processing, displays images of operation buttons and accepts a user operation, and accepts an operation of pressing a hardware button.

The DRAM 4 is a volatile memory and is used as a temporary workspace during an image processing process, for example. The storage 5 is a storage medium, such as a hard disk drive (HDD) or a solid state drive (SSD), and stores a program and data, for example. The NIC 6 is connected to a communication line and allows the image processing apparatus 1 and an external apparatus to communicate with each other via the communication line. The scanner 7 includes an image sensor or the like and optically scans an image on the surface of a sheet. The print engine 8 forms an image on a medium such as a sheet by using an electrophotographic system, for example. Hardware components included in the SOC 10 are connected to the bus 9, and the bus 9 allows such hardware components to exchange data.

The SOC 10 includes a central processing unit (CPU) 11, a ROM controller 12, a UI controller 13, a DRAM controller 14, a storage controller 15, an NIC controller 16, a scan image processor 20, and a print image processor 30. The CPU 11 executes a program stored on the ROM 2 or the storage 5 by using the DRAM 4 as its workspace, thereby controlling operations of the individual components. The ROM controller 12, the UI controller 13, the DRAM controller 14, the storage controller 15, and the NIC controller 16 respectively control an operation of the ROM 2, an operation of the UI 3, an operation of the DRAM 4, an operation of the storage 5, and an operation of the NIC 6.

The scan image processor 20 includes plural circuits that perform various kinds of image processing and performs image processing on image data obtained by scanning an image with the scanner 7. The image data on which image processing has been performed by the scan image processor 20 is stored on the storage 5, is transmitted to an external apparatus via the NIC 6, or is used by the print engine 8 to form the corresponding image on a medium. The print image processor 30 includes plural circuits that perform various kinds of image processing. The print image processor 30 supplies the print engine 8 with image data on which image processing has been performed by the plural circuits and causes the print engine 8 to form the corresponding image on a medium.

Figure 2:
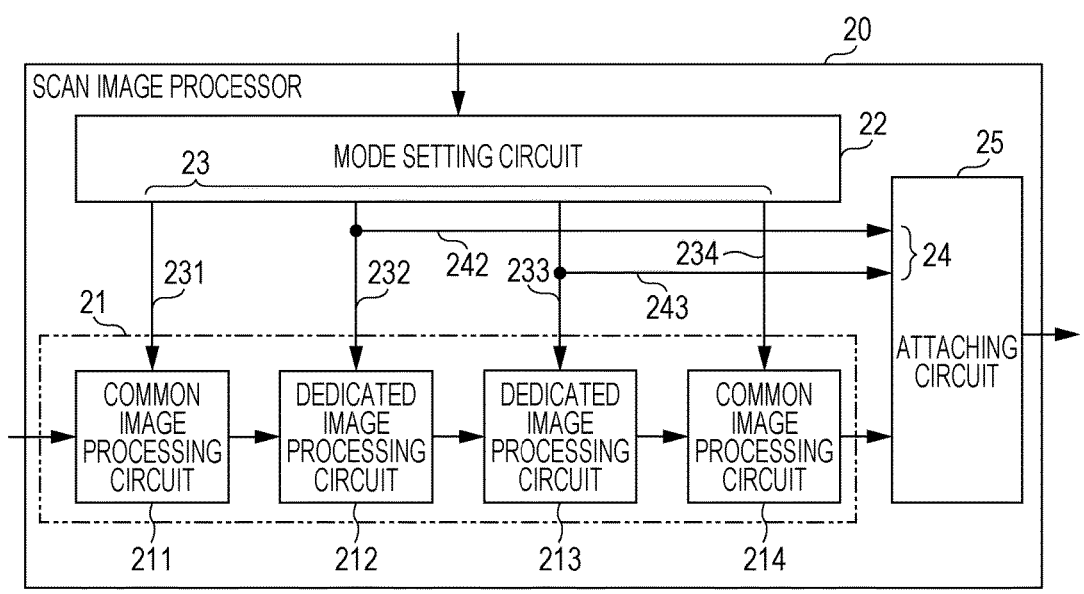
FIG. 2 illustrates a detailed configuration of a scan image processor.

FIG. 2 illustrates a detailed configuration of the scan image processor 20. The scan image processor 20 includes an image processing circuit group 21, a mode setting circuit 22, an instruction signal line group 23, a notification signal line group 24, and an attaching circuit 25. The image processing circuit group 21 includes plural image processing circuits each of which performs image processing. The example illustrated in FIG. 2 illustrates a common image processing circuit 211, a dedicated image processing circuit 212, a dedicated image processing circuit 213, and a common image processing circuit 214 as the image processing circuits included in the image processing circuit group 21.

Each of the common image processing circuits 211 and 214 is an image processing circuit which any user is authorized to use. Each of the dedicated image processing circuits 212 and 213 is an image processing circuit which a specific user is authorized to use. In the example illustrated in FIG. 2, the common image processing circuit 211 performs image processing on image data supplied from the CPU 11 and then supplies the resultant image data to the dedicated image processing circuit 212. The dedicated image processing circuit 212 performs image processing on the supplied image data and then supplies the resultant image data to the dedicated image processing circuit 213. The dedicated image processing circuit 213 performs image processing on the supplied image data and then supplies the resultant image data to the common image processing circuit 214. The common image processing circuit 214 performs image processing on the supplied image data and then supplies the resultant image data to the attaching circuit 25.

The mode setting circuit 22 determines one or more circuits that perform image processing in accordance with a mode specified by the CPU 11. The mode is information representing the operation scheme. Examples of the mode include an image enlarging mode, an image-quality increasing mode, and other modes, and combinations of such modes. Once the mode is determined, one or more image processing circuits to operate are also determined. That is, specifying the mode equates to specifying image processing to be performed.

After image processing to be performed is specified as a result of the mode being specified, the mode setting circuit 22 sends, to the corresponding image processing circuit that performs the specified image processing, an instruction signal to instruct the image processing circuit to operate. The instruction signal is a signal in which "0" and "1" alternately iterate in this exemplary embodiment. The mode setting circuit 22 is an example of a "sending unit" according to an aspect of the present invention. The instruction signal is an example of a "first signal" according to an aspect of the present invention.

The instruction signal line group 23 includes signal lines via each of which the instruction signal sent by the mode setting circuit 22 is transferred. Specifically, the instruction signal line group 23 includes instruction signal lines 231, 232, 233, and 234. One end of each of the instruction signal lines 231, 232, 233, and 234 is connected to the mode setting circuit 22, and the other end thereof is connected to the corresponding image processing circuit (corresponding one of the common image processing circuit 211, the dedicated image processing circuit 212, the dedicated image processing circuit 213, and the common image processing circuit 214). Upon receipt of the instruction signal from the corresponding instruction signal line connected thereto, each of the image processing circuits performs corresponding image processing.

The notification signal line group 24 includes signal lines via each of which a notification signal indicating that an instruction signal has been transferred is transferred. Specifically, the notification signal line group 24 includes notification signal lines 242 and 243. One end of the notification signal line 242 is connected to the instruction signal line 232, and the other end thereof is connected to the attaching circuit 25. One end of the notification signal line 243 is connected to the instruction signal line 233, and the other end thereof is connected to the attaching circuit 25.

That is, the notification signal lines 242 and 243 are connected to the instruction signal lines 232 and 233 connected to the dedicated image processing circuits 212 and 213, respectively. For example, via each of the notification signal lines 242 and 243, a signal (a signal in which "0" and "1" alternately iterate in this exemplary embodiment), which is substantially the same as the instruction signal transferred on the instruction signal line connected thereto, is transferred. No notification signal line is connected to the instruction signal lines 231 and 234 respectively connected to the common image processing circuits 211 and 214.

Each of the instruction signal lines 232 and 233 respectively connected to the notification signal lines 242 and 243 is an example of a "first signal line" according to an aspect of the present invention. Each of the notification signal lines 242 and 243 is an example of a "second signal line" according to an aspect of the present invention. In addition, each of the instruction signal lines 231 and 234 not connected to any notification signal line is an example of a "third signal line" according to an aspect of the present invention. Each of the dedicated image processing circuits 212 and 213 respectively connected to the instruction signal lines 232 and 233, each of which is an example of the first signal line, is an example of a "first circuit" according to an aspect of the present invention. Each of the common image processing circuits 211 and 214 respectively connected to the instruction signal lines 231 and 234, each of which is an example of the third signal line, is an example of a "second circuit" according to an aspect of the present invention.

Upon a notification signal being transferred thereto via the notification signal line 242 or 243 connected to thereto as described above, the attaching circuit 25 attaches notification information corresponding to the notification signal to an image obtained as a result of processing performed by the image processing circuit (the dedicated image processing circuit 212 or 213 in this exemplary embodiment) connected to the instruction signal line (the instruction signal line 232 or 233 in this exemplary embodiment) connected to the notification signal line.

Figure 3:
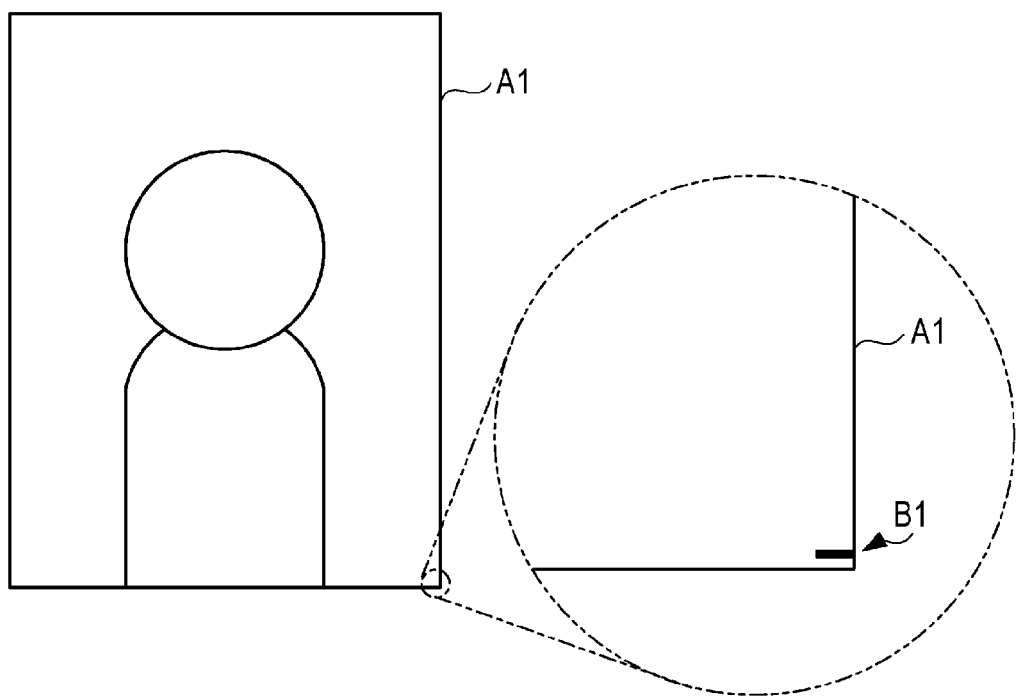
FIG. 3 illustrates an example of notification information attached to an image.

FIG. 3 illustrates an example of the notification information attached to an image. FIG. 3 illustrates an image A1 based on image data on which image processing has been performed by each of the image processing circuits 211 to 214 illustrated in FIG. 2 and a line image B1 attached at a corner of the image A1. The line image B1 is the notification information attached by the attaching circuit 25. The attaching circuit 25 then outputs the image data of the image having the notification information attached thereto to outside of the scan image processor 20. More specifically, the image output from the attaching circuit 25 reaches outside (the bus 9 in this case) without being transferred to the other circuits.

The output image data is sent to the user terminal via the NIC controller 16 and the NIC 6, for example. The user operates the user terminal to display the image based on the sent image data. If the line image B1 is attached at a corner of the image, that is, the scanned image, the user is informed that the dedicated image processing circuit has been used.

Note that the image processing circuit group 21 illustrated in FIG. 2 is merely an example, and image processing is performed by the common image processing circuit alone depending on the specified mode, for example. In the scan image processor 20, no notification signal line is connected to the instruction signal lines connected to the respective common image processing circuits including the instruction signal lines 231 and 234 illustrated in FIG. 2. Accordingly, when image processing is performed by the common image processing circuit alone, the notification signal is not transferred to the attaching circuit 25 and the notification information is not attached to an image. Thus, if the line image B1 is not attached at a corner of the scanned image, the user is informed that none of the dedicated image processing circuits have been used, that is, the common image processing circuit alone has been used.

Figure 4:
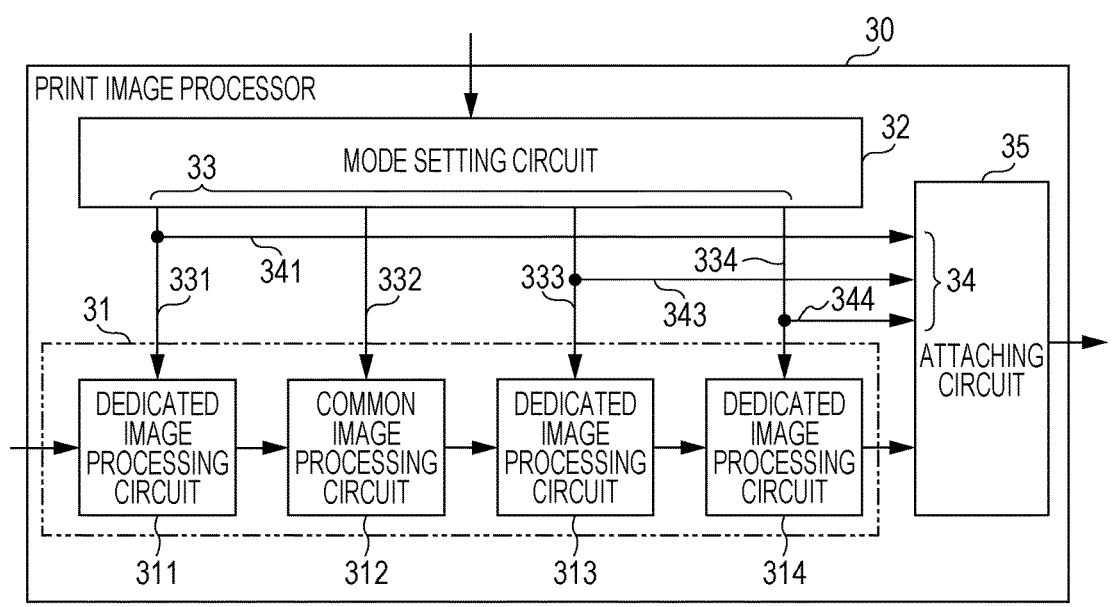
FIG. 4 illustrates a detailed configuration of a print image processor.

FIG. 4 illustrates a detailed configuration of the print image processor 30. The print image processor 30 includes an image processing circuit group 31, a mode setting circuit 32, an instruction signal line group 33, a notification signal line group 34, and an attaching circuit 35. This configuration is similar to the configuration illustrated in FIG. 2. However, the image processing circuit group 31 includes three dedicated image processing circuits 311, 313, and 314 and one common image processing circuit 312 in the example illustrated in FIG. 3.

The number of included dedicated image processing circuits, the number of included common image processing circuits, and the order in which image processing is performed change depending on the specified mode in this way. It is sufficient that one or more image processing circuits are used, and image processing may be performed by the dedicated image processing circuit alone or the common image processing circuit alone. Each of the scan image processor 20 and the print image processor 30 is an example of an "integrated circuit" according to an aspect of the present invention.

The image data of the image having the notification information attached by the scan image processor 20 is sent to the user terminal via the NIC controller 16 and the NIC 6 as described above. The sending process performed by the NIC controller 16 and the NIC 6 is a process for providing the user with the image having the notification information attached by the scan image processor 20. The set of the NIC controller 16 and the NIC 6 is an example of a "processor" according to an aspect of the present invention. In addition, a process for displaying an image on the UI 3 by the UI controller 13 and a process for forming an image on a medium by the print engine 8 are processes for providing the user with an image having the notification information attached thereto. Each of the print engine 8 and the set of the UI controller 13 and the UI 3 that perform these processes is an example of a "processor" according to an aspect of the present invention.

With the configuration described above, the image processing apparatus 1 performs an attaching process in which the notification information is attached to an image.

Figure 5:
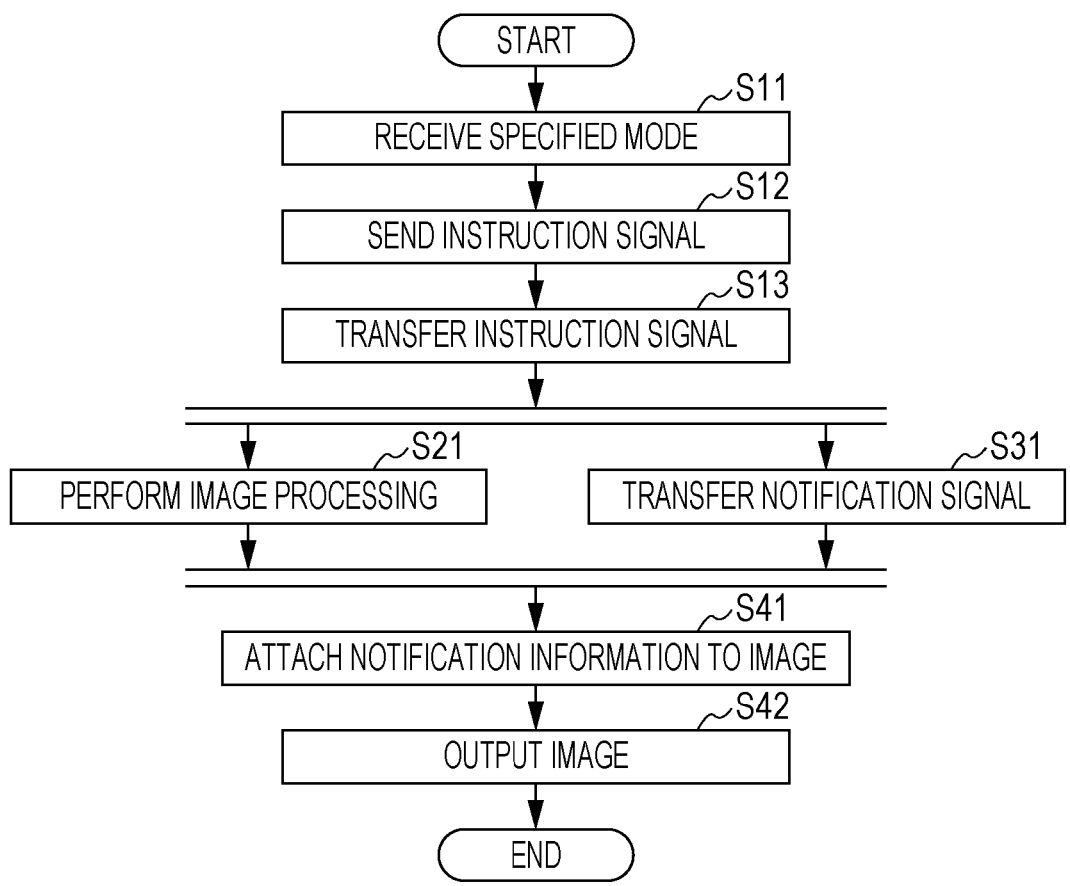
FIG. 5 illustrates an example of an operation procedure performed by an image processing apparatus during an attaching process.

FIG. 5 illustrates an example of an operation procedure performed by the image processing apparatus 1 during the attaching process. In the example illustrated in FIG. 5, it is assumed that image processing is performed by the scan image processor 20 and circuits that perform the image processing include one or more dedicated image processing circuits. This operation procedure starts upon the user performing an operation for specifying one of the modes in the image processing apparatus 1.

Upon receipt of the mode specified by the user (step S11), the mode setting circuit 22 in the image processing apparatus 1 sends an instruction signal to the instruction signal line connected to each image processing circuit that performs image processing specified for the specified mode (step S12). The instruction signal sent in step S12 is transferred via the instruction signal line group 23 in the image processing apparatus 1 (step S13).

Upon receipt of the instruction signal, the image processing circuit group 21 in the image processing apparatus 1 performs image processing on the supplied image data (step S21). In parallel to the operation in step S21, a notification signal indicating that the instruction signal has been transferred via the instruction signal line connected to the corresponding dedicated image processing circuit is transferred via the notification signal line group 24 in the image processing apparatus 1 (step S31). Then, the attaching circuit 25 in the image processing apparatus 1 attaches notification information corresponding to the notification signal transferred in step S31, to the image based on the image data on which the image processing has been performed in step S21 (step S41). Then, the attaching circuit 25 in the image processing apparatus 1 outputs the image data of the image having the notification information attached thereto (step S42).

In this exemplary embodiment, notification information attached to an image resulting from image processing informs the user that a specific circuit (dedicated image processing circuit) has been used. Further, since the notification information is not attached when the common image processing circuit is used, the image quality improves in the case where a specific circuit (dedicated image processing circuit) is not used, compared with the case where the notification information is attached every time any circuit is used. Further, since the attaching circuit 25 outputs the image data of the image having the notification information attached thereto to outside of the scan image processor 20 without transferring the image data to the other circuits in this exemplary embodiment, the image is not falsified in the integrated circuit.

2. Modifications

The above-described exemplary embodiment is merely an example of how the present invention is embodied and may be modified in the following manner. In addition, the exemplary embodiment and each of the modifications may be carried out in combination as needed.

2-1. Notification Information Attaching Method

The attaching method used by the attaching circuit 25 to attach the notification information is not limited to the above one. The attaching circuit 25 may attach, for example, yellow dots, which are unlikely to be recognized with the human eye, as the notification information or attach a digital watermark as the notification information. Alternatively, the attaching circuit 25 may attach the notification information by changing part of the image.

In addition, the attaching circuit 25 may attach text or an encoded code, such as a barcode or a QR code (registered trademark), as the notification information. Alternatively, the attaching circuit 25 may attach an image visible to the human as the notification information or an image invisible to the human (image from which the attached notification information is extractable by analyzing the image using a computer or the like) as the notification information. In either case of attaching the notification information by using any of these methods, it is desirable that a decrease in the image quality of the image caused by the attached notification information is small.

2-2. Detailed Notification Information

The line image B1 illustrated in FIG. 3 is notification information merely indicating that the dedicated image processing circuit has been used; however, the content of the notification information is not limited to this one, and more detailed notification information may be attached. For example, when yellow dots and a digital watermark is attached, the attaching circuit 25 may attach notification information representing identification information, such as a circuit name or a circuit number, for identifying the dedicated image processing circuit that has been used or notification information representing the date/time at which the dedicated image processing circuit has been used and the apparatus ID of the user terminal that has issued an instruction (this apparatus ID is provided to the attaching circuit 25 by the CPU 11, for example). In this way, the user is informed of a situation in which an unauthorized user has used the dedicated image processing circuit in more detail.

2-3. Resolution of Image

The notification information attaching method may change depending on the resolution of the image. In such a case, upon being supplied with image data on which processing has been performed by the dedicated image processing circuit, the attaching circuit 25 attaches notification information to an image based on the image data using a method corresponding to the resolution of the image. The attaching circuit 25 uses, for example, an attaching method table in which the resolution of the image and the attaching method are associated with each other.

FIG. 6 illustrates an example of the attaching method table. In the example illustrated in FIG. 6, an attaching method "PARTIAL MODIFICATION OF IMAGE" is associated with the resolution of the image "RESOLUTION< Th1". In addition, "Th1≤RESOLUTION≤T2" is associated with "YELLOW DOTS", and "Th2≤RESOLUTION" is associated with "DIGITAL WATERMARK". Upon being supplied with image data from the image processing circuit group 21, the attaching circuit 25 adds notification information by using the corresponding method associated with the resolution of the image.

For example, in the example illustrated in FIG. 6, a partially modified image is used if the resolution of the image is low because partial modification of the image does not stand out at low resolution. In contrast, if the resolution of the image is high, a scan accuracy of information represented by yellow dots or a digital watermark improves. Thus, these attaching methods are employed. According to this modification, notification information is attached using a method suitable for the resolution of the image.

2-4. Notification Information Attaching Timing

In the embodiment described above, the attaching circuit 25 attaches notification information to every image on which the image processing has been performed by the dedicated image processing circuit; however, the configuration is not limited to this one. The attaching circuit 25 may attach the notification information when image processing is performed by the dedicated image processing circuit a predetermined number of times, for example. In addition, the attaching circuit 25 may attach the notification information in a predetermined period (e.g., a period for which the image processing apparatus is frequently used or is rarely used) or in a period specified by an external apparatus (apparatus used by an administrator who manages the unauthorized use of the dedicated image processing circuit, for example).

The frequency with which the notification information is attached may be changed. In this case, the attaching circuit 25 attaches notification information to an image at a frequency corresponding to a frequency with which the notification signal is transferred thereto, for example. The attaching circuit uses, for example, an attaching frequency table in which the notification signal transferring frequency and the notification information attaching frequency are associated with each other.

FIG. 7 illustrates an example of the attaching frequency table. In the example illustrated in FIG. 7, notification information attaching frequency "EVERY IMAGE" is associated with the notification signal transferring frequency "FREQUENCY<10 TIMES/DAY". In addition, the notification information attaching frequency "EVERY 5 IMAGES" is associated with the notification signal transferring frequency "10 TIMES/DAY≤FREQUENCY<50 TIMES/DAY", and the notification information attaching frequency "EVERY 10 IMAGES" is associated with the notification signal transferring frequency "50 TIMES/DAY≤ FREQUENCY".

The attaching circuit 25 stores the notification signal transferring frequency with which the notification signal is transferred thereto from the notification signal line group 24, and attaches the notification information to an image with a frequency associated with the number of notification signals transferred on the previous day (representing the notification signal transferring frequency in this example) in the attaching frequency table. In the example illustrated in FIG. 7, the attaching frequency is decreased as the number of times the dedicated image processing circuit is used increases. If the dedicated image processing circuit is used a small number of times, the number of images having the notification information attached thereto also decreases. That is, it becomes difficult to find images having the notification information attached thereto if the attaching frequency is low. In such a case, the attaching frequency is increased in the example illustrated in FIG. 7 to make it easier to find images having the notification information attached thereto.

If the attaching frequency is high when the dedicated image processing circuit is used many times, the number of images having the notification information attached thereto increase, which is likely to give the user an impression that the image quality has changed. In the example in FIG. 7, the possibility of giving such an impression is reduced by decreasing the attaching frequency in such a case. Note that the attaching frequency may be increased as the number of times the dedicated image processing circuit is used increases in order to prompt unauthorized users who often use the circuit to become aware that they are using the circuit which they are not authorized to use. In either case, the notification information is attached with a frequency corresponding to the use frequency of a specific circuit.

2-5. Arrangement of Attaching Circuit

Arrangement of the attaching circuit may be different from that described in the exemplary embodiment.

Figure 8:
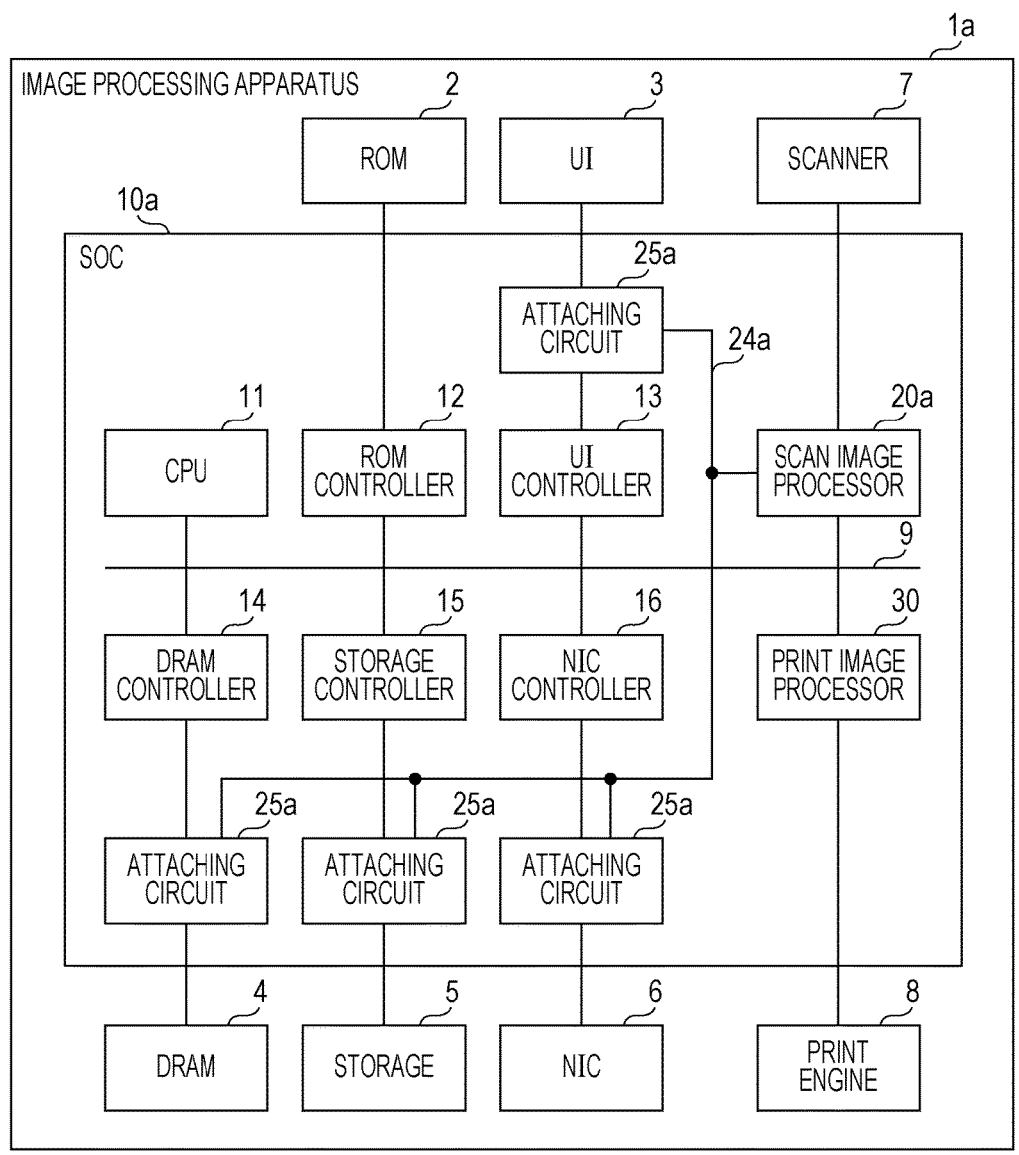
FIG. 8 illustrates a hardware configuration of an image processing apparatus according to a modification.

FIG. 8 illustrates a hardware configuration of an image processing apparatus 1a according to a modification. The image processing apparatus 1a includes an SOC 10a. The SOC 10a includes a scan image processor 20a, a notification signal line group 24a, and four attaching circuits 25a. Each of the four attaching circuits 25a is connected to a corresponding one of the UI controller 13, the DRAM controller 14, the storage controller 15, and the NIC controller 16.

Each of the attaching circuits 25a is connected to the scan image processor 20a via the notification signal line group 24a.

If image processing is performed on an image A using a dedicated image processing circuit in the scan image processor 20a, a notification signal is transferred to the attaching circuit 25a from the scan image processor 20a via the notification signal line group 24a. For example, if the UI controller 13 supplies the image A to the attaching circuit 25 to display the image A on the UI 3 in response to an operation for displaying the image A on a touchscreen, the attaching circuit 25a attaches the notification information to the supplied image A and outputs the resultant image to the UI 3. In this way, the attaching circuit 25a outputs an image having notification information attached thereto, to outside of the SOC 10a without transferring the image to the other circuits.

The rest of the attaching circuits 25a add notification information to an image that is to be output to the DRAM 4, the storage 5, and the NIC 6 and output the image having the notification information attached thereto to outside of the SOC 10a without transferring the image to the other circuits. The SOC 10a according to this modification is an example of an "integrated circuit" according to an aspect of the present invention. The image having the notification information attached thereto is not falsified in the integrated circuit also in this modification as in the exemplary embodiment.

2-6. Categories of Invention

The present invention is construed as an integrated circuit including an attaching circuit, just like the scan image processor 20, the print image processor 30, or the SOC 10a and an image processing apparatus including such an integrated circuit. In addition, the present invention is construed as an information processing method for implementing a process performed by the integrated circuit and the image processing apparatus and a program causing a computer to function as the integrated circuit and the image processing apparatus. This program may be provided in a form of a recording medium, such as an optical disc storing the program thereon, or may be downloaded and installed on a computer via a communication line, such as the Internet, so as to be usable.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An integrated circuit located in a scan image processor, the integrated circuit comprising:
a first signal line via which a first signal specifying image processing to be performed is transferred;
a first circuit that is connected to the first signal line and that performs the image processing corresponding to the first signal on a scanned image upon the first signal being transferred thereto, wherein only specific users are authorized to use the first circuit;
a second signal line that is connected to the first signal line and via which a second signal indicating that the first signal has been transferred to the first circuit is transferred; and
an attaching circuit that is connected to the second signal line and that attaches, upon the second signal being transferred thereto via the second signal line, information notifying that the first circuit has been used on a processed scanned image resulting from the image processing performed by the first circuit.

2. The integrated circuit according to claim 1, wherein the attaching circuit outputs the processed scanned image having the attached information to outside of the integrated circuit.

3. The integrated circuit according to claim 1, further comprising:
a third signal line via which the first signal is transferred; and
a second circuit that is connected to the third signal line and that performs image processing corresponding to the first signal upon the first signal being transferred thereto, wherein
any user is authorized to use the second circuit, and
the attaching circuit is not connected to the third signal line via a signal line.

4. The integrated circuit according to claim 1, further comprising:
a sending circuit that sends the first signal to a signal line connected to a circuit that performs specified image processing.

5. The integrated circuit according to claim 1, wherein the attaching circuit attaches, upon being supplied with the processed scanned image resulting from the image processing performed by the first circuit, the information to the processed scanned image by using a method corresponding to resolution of the scanned image.

6. The integrated circuit according to claim 1, wherein the attaching circuit attaches the information to the processed scanned image with a frequency corresponding to a frequency with which the second signal is transferred thereto.

7. An image processing apparatus comprising:
the integrated circuit according to claim 1; and
a processor that performs a process for providing a user with the processed scanned image having the information attached by the integrated circuit.

8. An image processing method for a scan image processor, the image processing method comprising:
transferring a first signal, specifying image processing to be performed, via a first signal line;
performing, with a first circuit connected to the first signal line, the image processing corresponding to the first signal on a scanned image upon the first signal being transferred to the first circuit, wherein only specific users are authorized to use the first circuit;
transferring a second signal via a second signal line connected to the first signal line, the second signal indicating that the first signal has been transferred to the first circuit; and
attaching, with an attaching circuit connected to the second signal line, information notifying that the first circuit has been used on a processed scanned image resulting from the image processing performed with the first circuit, upon the second signal being transferred to the attaching circuit.

* * * * *